United States Patent [19]
Norsk

[11] Patent Number: 5,167,933
[45] Date of Patent: Dec. 1, 1992

[54] HEAT EXCHANGE REFORMING PROCESS AND REACTOR SYSTEM

[75] Inventor: Jesper Norsk, Humlebaek, Denmark
[73] Assignee: Haldor Topsoe A/S, Denmark
[21] Appl. No.: 648,587
[22] Filed: Jan. 31, 1991
[30] Foreign Application Priority Data
  Feb. 2, 1990 [DK] Denmark .............................. 0283/90
[51] Int. Cl.$^5$ .............................................. C01C 1/02
[52] U.S. Cl. ...................... 422/148; 422/189; 422/196; 422/197; 422/201; 423/359; 423/360
[58] Field of Search ............... 422/148, 189, 196, 197, 422/201; 423/359, 360

[56] References Cited

U.S. PATENT DOCUMENTS

| | | | |
|---|---|---|---|
| 4,162,290 | 7/1979 | Crawford et al. | 422/190 |
| 4,296,085 | 10/1981 | Banquy | 423/359 |
| 4,298,589 | 11/1981 | LeBlanc et al. | 422/148 |
| 4,637,918 | 1/1987 | Osman et al. | 422/148 |
| 4,789,527 | 12/1988 | Osman et al. | 422/148 |

FOREIGN PATENT DOCUMENTS

| | | |
|---|---|---|
| 0334540A2 | 9/1989 | European Pat. Off. |
| 2213496A | 8/1989 | United Kingdom |

*Primary Examiner*—Robert J. Warden
*Assistant Examiner*—Timothy M. McMahon
*Attorney, Agent, or Firm*—Ostrolenk, Faber, Gerb & Soffen

[57] ABSTRACT

A process and apparatus for steam reforming of hydrocarbons. Heat from a product stream of reformed gas is utilized to supply heat required for endothermic reforming of a process gas of hydrocarbons and steam by indirect heat exchange between the product stream and process gas. The temperature of metallic materials of gas heated reactors used in the reforming is controlled so as to avoid metal dusting on tube walls of the gas heated reactors.

5 Claims, 3 Drawing Sheets

HEAT EXCHANGE REFORMING PROCESS AND REACTOR SYSTEM

The present invention relates to a process for steam reforming of hydrocarbons and a reactor system for carrying out the process. In particular, the invention relates to a process for steam reforming of hydrocarbons in the presence of a catalyst during which process heat from a product stream of reformed gas is utilized to supply heat required for the endothermic reforming reactions in a process gas of hydrocarbons and steam by indirect heat exchange between the product gas and process gas.

The endothermic reactions, occurring during steam reforming of hydrocarbons can be illustrated by the following reaction schemes:

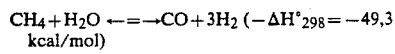
(1)

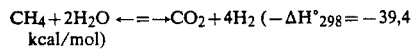
(2)

Corresponding reaction schemes can be established for steam reforming of higher hydrocarbons. The endothermic reactions (1) and (2) occur in the process gas when it is passed through a steam reforming catalyst at steam reforming conditions. Necessary heat for reactions (1) and (2) is conventionally supplied by combustion of fuel in a radiant furnace chamber in which the catalyst is arranged in vertical tubes extending through the chamber.

It is known to supply a part of the heat by utilizing a product stream of reformed gas as a source of heat. Such a process is mentioned in U.S. Pat. No. 4,162,290, wherein during a sequence of primary and secondary reforming a portion of the hydrocarbon feed is heated in a heat exchanger reactor by indirect heat exchange with the effluent from the secondary reforming in counter-flow to the hydrocarbon feed subjected to primary reforming. Counter-flow heat exchange in steam reforming processes with a product stream from a secondary reformer is further mentioned in EP Patent 194,067 and EP Patent 113,198.

U.S. Pat. No. 4,678,600 and U.S. Pat. No. 4,830,834 disclose a reforming process by counter-flow and parallel-flow heat exchange with flue gas from a burner and reformed product gas and a heat exchange reforming reactor comprising concentric arranged a burner chamber, an inner catalyst chamber and an outer catalyst chamber for carrying out the heat exchange steam reforming process. By the disclosed process and reactor a process gas of hydrocarbon feed and steam is passed through the outer catalyst chamber in counter-flow and in indirect heat exchange simultaneously with moderately hot flue gas from the burner chamber and a reforming product stream leaving the inner catalyst chamber. The process gas is subsequently passed through the second catalyst chamber in parallel-flow and indirect heat exchange with the hot flue gas from the burner chamber.

The known heat exchange reforming processes improve the process economy by using hot gases obtained in a secondary reforming process for the heat demanding primary reforming process. However, none of the known processes takes precaution against corrosion problems, occurring on the materials used in heat exchange reforming reactors.

It is known that a reformed gas having hydrocarbons with a high carbon monoxide content causes strong carburizing reactions on the metallic materials used for the equipment being in contact with those gases. The result is local mechanical fracturing of the material surface layers, with subsequent pitting or breaking-up of protective scales, as filaments or a fine dust. This phenomenon, known as metal dusting, occurs with different metallic materials within different temperature ranges. Thus, to prevent metal dusting and consequent disruption of the reforming process certain prohibit metal temperature ranges should be avoided during heat exchange reforming.

It is, therefore, an object of the present invention to provide a process for steam reforming of hydrocarbons by which heat from a reformed product gas stream is utilized at optimum conditions and in which prohibited metal temperatures are avoided at which metal dusting occur.

It is further an object of the invention to provide a reactor system for carrying out the process.

Pursuant to the main concept of the present invention, the above and other objectives are realized in an improved process for steam reforming of hydrocarbons by primary and secondary reforming, the improvement of which comprises:

(i) reacting a process gas stream of hydrocarbon feed and steam in a first gas heated reactor in the presence of a steam reforming catalyst to a partially primary reformed process gas stream by indirect heat exchange with a moderately hot product gas stream from the shell side of a second gas heated reactor introduced into the shell side of the first gas heated reactor in counter-flow to the reacting process gas stream in the first gas heated reactor;

(ii) dividing the partially primary reformed process gas stream from the first gas heated reactor into a first and second substream;

(iii) reacting the first substream in the presence of a steam reforming catalyst in a convective heated tubular reactor furnace to a primary reformed gas stream;

(iv) reacting the second substream in the second gas heated reactor in the presence of a steam reforming catalyst by indirect heat exchange with a hot product gas stream from an adiabatic secondary reforming reactor introduced into the shell side of the second gas heated reactor in parallel-flow to the reacting second substream in the second gas heated reactor to provide a primary reformed gas stream and to cool the hot product gas stream to the moderately hot product gas stream;

(v) combining the primary reformed gas stream obtained in step (iii) and (iv); and (vi) reacting the combined primary reformed gas stream in the adiabatic secondary reforming reactor with an oxidant gas in the presence of a secondary steam reforming catalyst to form the hot product gas stream.

Hydrocarbon feed for the primary reforming process may be any hydrocarbon, hydrocarbon fraction, or mixture of hydrocarbons conventionally used as feed for steam hydrocarbon reforming. Typical feeds are natural gas, refinery off-gases, liquified petroleum gas, and various naphtha fractions such as light petroleum distillates. In order to be suitable as feed for steam reforming, the hydrocarbon feed is usually subjected to desulphurization to reduce its total sulphur content below 1 ppm by weight.

Steam is added to the hydrocarbon feed in an amount by which a process gas is provided having a steam to carbon ratio sufficiently high to prevent carbon deposition on the reforming catalyst when passing through the catalyst. As used herein below, the steam to carbon ratio is expressed in terms of mol steam per atom carbon.

The primary steam reforming reactions in the process gas are initiated by contacting the feed with the steam reforming catalyst arranged in the first gas heated reactor. The temperature of the process gas at the inlet of the catalyst is typically 400° C. to 700° C. and steam reforming is carried out at steam to carbon ratios of between 1.1 and 7.0, preferably 2.0 to 4.5. For economic reasons, the steam reforming process is conducted at elevated pressure of about 2–60 bar. Within this range the operating pressure can be adjusted to a pressure at which the product stream will be utilized or subjected to further processing, for instance to 30–40 bar.

The conditions used in the tubular reactor furnace and the adiabatic secondary reforming reactor are conventional. Thus, the steam reforming catalyst for the primary reforming may be any of the commercially available steam reforming catalysts. The catalytic active component of such catalysts is metallic nickel, usually supported on ceramic carrier materials. Suitable catalysts for the secondary reforming are nickel or mixtures of nickel oxide and metal oxides, such as the nickel oxide catalyst promoted with iron oxide, cobalt oxide or magnesium oxide disclosed in U.S. Pat. No. 3,926,583.

The temperature of the combined primary reformed gas stream at the inlet of the adiabatic reactor may vary within 700° C. and 900° C., depending on the operating condition in the primary reforming process and raises to between 800° C. and 1100° C. at the outlet of the adiabatic reactor by reaction with the oxidant gas.

In a preferred embodiment of the invention the oxidant gas consists of air giving a product gas useful for the production of ammonia. It may be further preferable to use oxygen or oxygen-enriched air, for instance in the preparation of synthesis-gas for the production of oxygenated hydrocarbons, such as alcohols, ethers or carboxy compounds.

Thus in still a preferred embodiment of the invention oxygen or oxygen-enriched air is used as oxidant gas during the secondary reforming process.

An essential feature of the process according to the invention is the distribution of heat contained in the product gas from the adiabatic reactor. The hot product gas leaving the adiabatic reactor at a temperature of between 900° C. and 1100° C. is passed to the second gas heated reactor supplying heat to the primary reforming reactions by flowing at the shell side of the reactor in parallel-flow and indirect heat exchange with the process gas at the tube side of the reactor. Thereby the hot product gas is cooled to a moderately hot product gas, the heat content of which is used in the first gas heated reactor to supply heat for the reforming reactions by indirect heat exchange with the process gas in counter-flow with the moderately hot process gas.

By combination of parallel-flow and counter-flow heat exchange and by adjustment of the split ratio in the partially primary reformed gas leaving the first gas heated reactor and being distributed to the reactor furnace and the second gas heated reactor the temperature of reactor tubes in the gas heated reactors can be kept outside the critical temperature ranges, where severe metal dusting is known to occur on the metallic materials used for the tubes.

A further object of the present invention is to provide a reactor system for carrying out the improved process, which reactor system comprises:

(i) a first gas heated reactor with reforming tubes for partially primary reforming of hydrocarbon feed with steam, adapted to receive heat by indirect counter-flow heat exchange with a moderately hot product gas stream introduced into the shell side of the reactor;

(ii) means for dividing the partially reformed process gas from the first gas heated reactor into a first and second substream;

(iii) a tubular reactor furnace with reforming tubes and means for producing radiant heat by burning fuel, adapted to receive and react the first substream to produce a primary reformed gas stream;

(iv) a second gas heated reactor with reforming tubes for receiving and primary reforming the second substream, adapted to receive heat by indirect parallel-flow heat exchange with a hot product gas stream introduced into the shell side of the reactor and to cool the hot product gas stream to the moderately hot product gas stream;

(v) means for combining and passing the primary reformed gas stream obtained in the tubular reactor furnace and in the second gas heated reactor to an adiabatic secondary reforming reactor;

(vi) means for passing an oxidant gas to the adiabatic secondary reforming reactor;

(vii) the adiabatic reactor adapted to receive and react the combined primary reformed gas stream with the oxidant gas to produce the hot product gas stream;

(viii) means for passing and introducing the hot product gas stream from the adiabatic reactor into the shell side of the second gas heated reactor; and (ix) means for passing and introducing the moderately hot product gas stream from the second gas heated reactor to the first gas heated reactor.

BRIEF DESCRIPTION OF THE DRAWINGS

The above and other objects and aspects of the present invention will become more apparent from the following detailed description with reference to the accompanied drawings, in which:

FIG. 1 shows a flow diagram of a steam reforming process according to one embodiment of the invention performed in a reactor system comprising two gas heated reactors in series. The Figure is simplified and various installations, such as valves, pumps and equipment for preheating and purification of the hydrocarbon feed, which are well known in the art, are not shown in the Figure.

Figure 1:
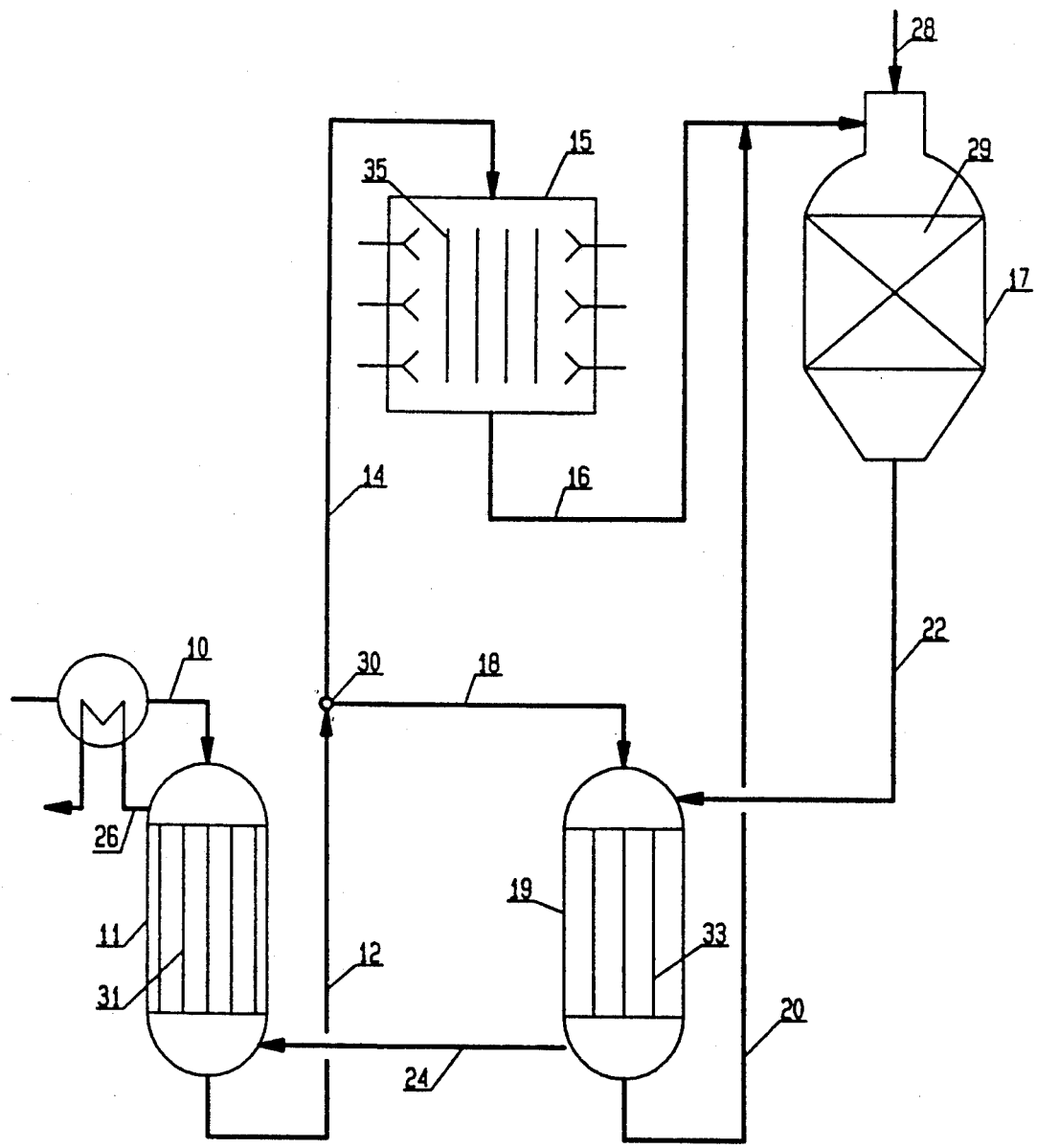
FIG. 1 shows a simplified flow diagram of the inventive process.

A purified process gas stream 10 containing hydrocarbon feed and steam is preheated in known manner to a temperature of about 500°–600° C. by heat exchange with product gas stream 26 leaving gas heated reactor 11 at a temperature of about 550°–650° C. The preheated process gas is distributed and passed through a number of elongated tubes 31 arranged in the first gas heated reactor 11. Tubes 31 are filled with a conventional reforming catalyst. A hot product gas 22 leaving adiabatic reactor 17 at a temperature of about 950°-1050° C. is cooled to a moderately hot product gas in second gas heated reactor 19, as further described below. The moderately hot product gas 24 is introduced at a temperature of about 810°-900° C. into the shell side of first gas heated reactor 11 to supply heat for the reforming reactions, which occur in the process gas passing through tubes 31 in heat exchanging relationship with the moderately hot product gas flowing at the shell side of tubes 31 in counter-flow direction with the process gas. Thereby the wall temperature of tubes 31 is kept at temperatures of about 500°-600° C. at the inlet side and 650°-770° C. at the outlet side of tubes 31.

During its passage through the first gas heated reactor 11 the process gas is converted to a partially primary reformed gas 12, which leaves reactor 11 at a temperature of about 610°-670° C. Gas 12 is divided in tee 30 to substream 14 and substream 18. The tee 30 may be valve guided allowing distribution of gas 12 into substream 14 and 18 in variable split ratios. Between about 20 and 60% by volume of the partially primary reformed gas 12 is passed as substream 18 to the second gas heated reactor 19. The residue of gas 12 is introduced by substream 14 into a conventional reformer tube furnace 15, comprising side-fired reformer tubes 35 filled with reforming catalyst for finally primary reforming of the partially primary reformed gas in substream 14.

The partially primary reformed gas in substream 18 is converted to primary reformed gas by passage through elongated tubes 33, which are arranged in reactor 19 and filled with primary reforming catalyst. Necessary heat for the endothermic reforming reactions in the gas are supplied by indirect heat exchange with the hot product gas 22 from the adiabatic reactor 17 introduced into the shell side of reactor 19 in parallel-flow with the gas 18 in tubes 33. The hot product gas 22 is, thereby, cooled from temperature of about 950°-1100° C. at the inlet of reactor 19 to an outlet temperature of about 810°-900° C. and passed as the moderately hot product gas 24 to the first gas heated reactor 11, as described above.

The temperature at the walls of tubes 33 ranges from between 860° C. and 910° C. at the inlet side to between 780°-890° C. at the outlet side of tubes 33. The actual temperature depends, thereby, on the amount of substream 18, which is passed to reactor 19 by adjusting the split ratio in gas 12 by tee 30.

Thus, by controlling the amount of the partially primary reformed gas passed by substream 18 to reactor 19 and by counter-flow and parallel-flow heat exchange in gas heated reactor 11 and 19, respectively, it is possible to control the temperature in the metallic materials used for the gas heated reactors. Critical temperature intervals are, thereby, avoided, where severe metal dusting occurs on the tube walls in the gas heated reactors 11 and 19, which are in contact with product gas 22 and 24 having a high content of carbon monoxide.

The effluents from reactor 15 and 19, containing primary reformed gas 16 and 20 are combined and introduced into adiabatic reactor 17 having a bed of conventional secondary reforming catalyst 29. To carry out the secondary reforming process oxidant gas 28 is also introduced into the reactor 17. Heat liberated during the partial oxidation of hydrogen and hydrocarbons contained in the primary reformed gas raises the temperature of the gas from about 800°-900° C. at the inlet to about 1000°-1100° C. at the outlet of adiabatic reactor 17.

The secondary reformed gas leaving adiabatic reactor 17 as hot product gas 22 is passed to the shell side of reactor 19, where it is cooled to moderately hot product gas 24, which and further is passed to the shell side of reactor 11, as described above more detailed.

Figure 2:
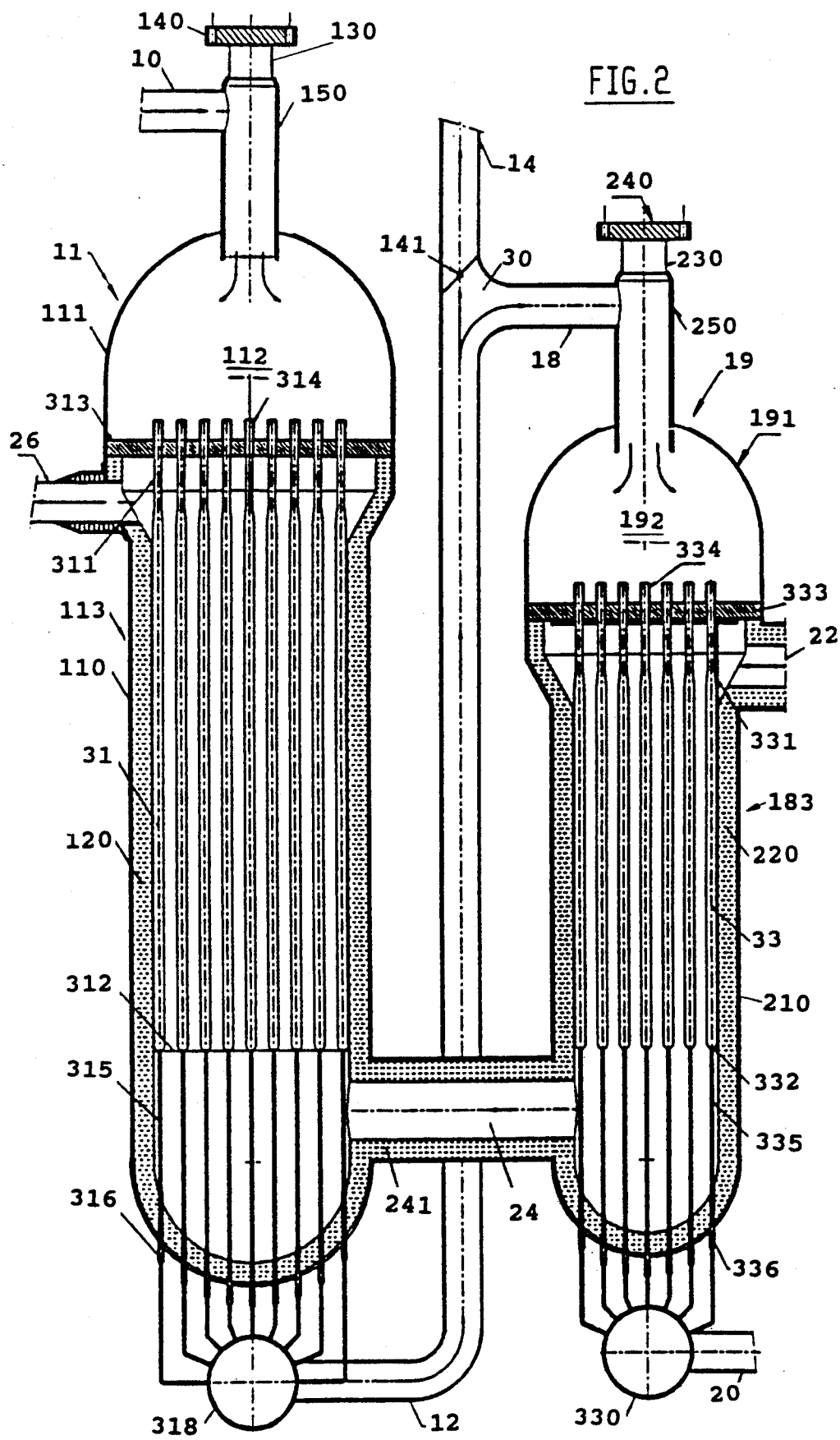
FIG. 2 is a longitudinal section of a gas heated reactor assembly according to one embodiment of the invention.

The configuration and operation of a specific embodiment of the reactor system according to the invention is illustrated by FIG. 2, showing a longitudinal section of the gas heated reactor assembly.

The reactor furnace and adiabatic reactor are conventional and not shown in the Figure.

The gas heated reactor assembly comprises counter-flow heat exchanger reactor 11 and parallel-flow heat exchanger reactor 19 connected to reactor 11 by connection section 24.

Reactor 11 and 19, have upper sections 111, 191 and lower sections 113, 193 confined by pressure shells 110, 210, respectively, which in the lower sections 113, 193 are insulated by heat resistant insulation 120, 220 adjacent to the pressure shell 110, 210. Suitable insulation materials may be any of the heat resistant materials such as firebricks and concrete able to withstand high temperatures.

The upper section 111 and 191 of reactor 11 and 19 respectively, are provided with connection piece 150, 250 including manhole 130, 230 and lid 140 and 240.

Reactor 11 and 19 contain a plurality of reforming tubes 31, 33, which inlet sides 311, 331 extend through tubesheets 313, 333 and are mounted in tubesheets 313, 333 by means of expansion joints 314, 334 as further described hereinafter with reference to FIG. 3. The inlet sides 311, 331 of reforming tubes 31, 33 are formed as bottlenecks ensuring optimum distribution of gas flowing to or from the shell side of tubes 31, 33. Tubes 31, 33 are connected at their arched bottoms 312, 332 to gas outlet pipes 315, 335 inside the lower sections 113, 193 of reactor 11 and 19. Gas outlet pipes 315, 335 extend through the bottom of pressure shell 110 and 210, respectively, which at the transit points of outlet pipes 315, 335 are tightened by cylindrical temperature gradient compensation tubes 316, 336, which surround gas outlet pipes 315, 335 adjacent to the transition point and are fastened to the outside of the pressure shells 110, 210.

Process gas is introduced into reactor 11 by inlet pipe 10 connected to inlet piece 150 and further distributed to reforming tubes 31 from enclosure 112 at the upper section 111 of reactor 11. The gas is partially primary reformed by passage through a reforming catalyst loaded in reforming tubes 31. As described herein before necessary heat for the reforming reaction is supplied by a moderately hot product gas conducted from reactor 19 to the shell side of reactor 11 via connection section 24. Section 24 is lined with refractory insulation material 241, in order to avoid loss of heat from the moderately hot product gas. The moderately hot product gas introduced adjacent to the bottom of tubes 31 flows at the shell side of tubes 31 in counter-flow to the reacting process gas in the tubes and leaves reactor 11 through outlet 26 adjacent to the inlet side 311 of tubes 31. Heat is thereby transferred to the reacting process gas by indirect heat exchange with the moderately hot product gas.

The partially primary reformed gas leaves tubes 31 via gas outlet pipes 315 and is collected in gas collector 318 connected to the outlet pipes 315 outside reactor 11.

From collector 318 the gas is passed in pipe 12 to tee 30. Tee 30 is provided with throttle valve 141, which regulates the amount of partially reformed gas being introduced into reactor 19 via pipe 18 and connecting piece 250. From enclosure 192, situated in the upper section 191 of reactor 19, the gas is distributed to reforming tubes 33 loaded with primary reforming catalyst. By passage through the catalyst the partially primary reformed gas is converted to a primary reformed gas, leaving reactor 19 in outlet pipes 335. Pipes 335 are connected to gas collector 330 outside reactor 19. The primary reformed gas collected in gas collector 330 is passed via pipe 20 to an adiabatic reactor (not shown) for further processing. Necessary heat for the reforming process occurring in the partially primary reformed gas in tubes 33 is supplied by a hot product gas from the adiabatic reactor. The hot gas is introduced into reactor 19 through inlet 22 adjacent to the inlet side 331 of tubes 33. The hot product gas flows, thereby, on the shell side of tubes 33 in parallel-flow and heat exchanging relationship to the reacting gas in tubes 33 and is cooled to the moderately hot product gas, which leaves reactor 19 through connection section 24 for being passed to reactor 11.

Figure 3:
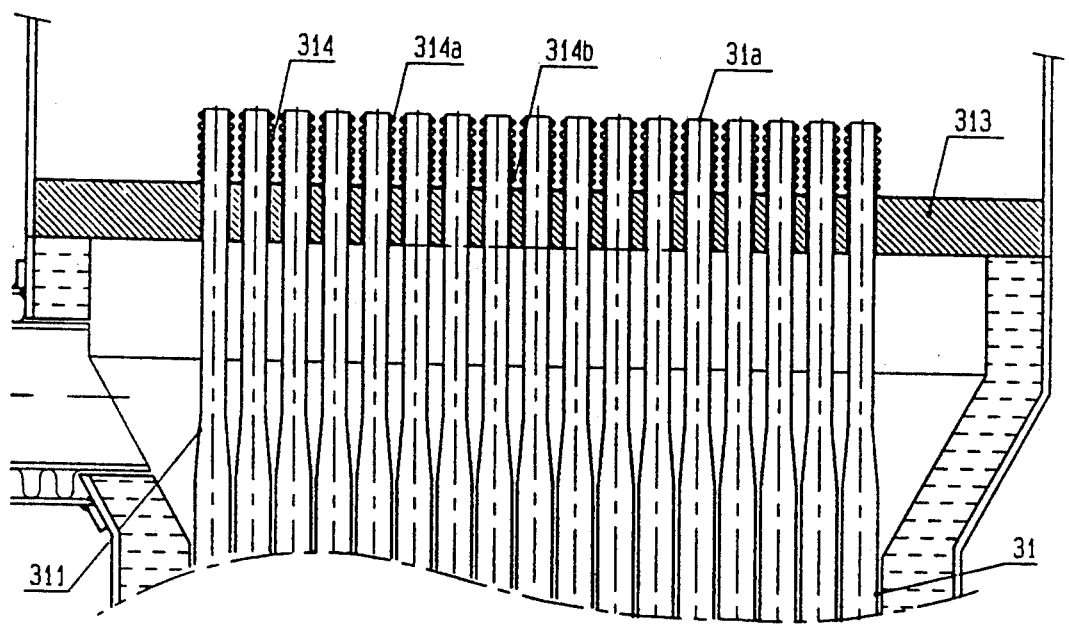
FIG. 3 is an enlarged section of a part of the reactor assembly shown in FIG. 2.

An advantageous feature of the specific embodiment of the gas heated reactors 11, 19 shown in FIG. 2 is the configuration and installation of reforming tubes 31, 33 as shown in more detail in FIG. 3, which is an enlarged view of the inlet side of reforming tubes 31 in reactor 11. The inlet side and installation of the reforming tubes in reactor 19 is constructed in similar manner to that of reactor 11 and not shown in the Figure.

Each reforming tube 31 is formed as bottleneck at the inlet side 311 extending through tubesheet 313. Tubes 31 are fastened on tubesheet 313 by expansion joints 314.

The expansion joints 314, are formed as metallic bellows concentric surrounding the upper ends of tubes 31, which extend through tubesheet 313. The upper ends 314a of expansion joints 314 are fastened to the inlets 31a of tubes 31, the lower ends 314b are fastened to tubesheet 313, thereby providing a telescopic suspension of tubes 31 in tubesheet 313, which allows thermal expansion of the tubes. As mentioned hereinbefore the inlet sides 311 are formed as bottlenecks, which on one hand facilitates the suspension of the tubes in tubesheet 313 by saving place and on the other hand provides an optimum gas flow for the product gas at the shell side of tubes 31 by a reduced pressure drop due to the extended space obtained by narrowing the diameter of the inlet side 311 of the tubes.

EXAMPLE

In the following example the invention is applied in 3 computation models illustrating the advantage of the process and reactor system according to one embodiment of the invention in the preparation of synthesis gas for ammonia production.

A process gas having the following composition in mole%:

| | |
|---|---|
| $O_2$ | 0.00 |
| $H_2$ | 1.01 |
| $H_2O$ | 70.45 |
| $N_2$ | 0.35 |
| CO | 0.00 |
| $CO_2$ | 0.04 |
| Ar | 0.00 |
| $CH_4$ | 28.14 | is preheated to 510° C. and passed to the first gas heated reactor 11 (FIG. 1). By passage through reactor 11 the process gas is reacted to partially primary reformed gas 12 by indirect heat exchange with moderately hot product gas 24. The partially primary reformed gas 12 is divided to substream 14 and substream 18 in a split ratio of stream 14:18 of 3.4 (computation model 1), 1.8 (computation model 2) and 0.7 (computation model 3).

The partially primary reformed gas in substream 18 is then converted to primary reformed gas 20 by passage through reactor 19 in indirect heat exchange with hot product gas 22 and combined with primary reformed gas 16 obtained in conventional reformer furnace 15 by reforming the partially primary reformed gas in substream 14.

The combined gases 20 and 16 are finally converted to secondary reformed product gas 22 in conventional adiabatic secondary reformer 17 by reaction with air 28 also introduced into reformer 17.

The hot product gas 22 leaving reactor 17 is passed to the shell side of reactor 19, and thereby cooled to the moderately hot product gas 24, which is conducted to the shell side of reactor 11 and withdrawn after passage through reactor 11 as product gas 26 for use in ammonia synthesis.

The above and further process parameters are summarized in Table 1-3 below, representing the results obtained by computation model 1-3, respectively.

The position/stream numbers referred to in the Tables correspond to the numbers described above and shown in FIG. 1.

TABLE I

| Position/Stream No. | 10 | 12 | 18 | 20 | 14 |
|---|---|---|---|---|---|
| Temp(°C.) | 560.0 | 660.8 | 660.8 | 865.7 | 660.8 |
| Pressure(bar) | 35.5 | 34.6 | 34.6 | 34.5 | 34.6 |
| Flow(Nm³/h) | 121,830 | 139,680 | 31,453$^{(\S)}$ | 38,457 | 108,227$^{(\S)}$ |
| Gas Compos.(mole %) | | | | | |
| $O_2$ | 0.00 | 0.00 | 0.00 | 0.00 | 0.00 |
| $H_2$ | 1.01 | 24.88 | 24.88 | 48.73 | 24.88 |
| $H_2O$ | 70.45 | 50.23 | 50.23 | 30.91 | 50.23 |
| $N_2$ | 0.35 | 0.31 | 0.31 | 0.25 | 0.31 |
| CO | 0.00 | 1.56 | 1.56 | 9.32 | 1.56 |
| $CO_2$ | 0.04 | 4.86 | 4.86 | 5.04 | 4.86 |
| Ar | 0.00 | 0.00 | 0.00 | 0.00 | 0.00 |
| $CH_4$ | 28.14 | 18.16 | 18.16 | 5.74 | 18.16 |
| Position/Stream No. | 16 | 28 | 22 | 24 | 26 |
| Temp(°C.) | 810.0 | 550.0 | 1024.1 | 895.9 | 603.3 |
| Pressure(bar) | 32.7 | 33.0 | 31.0 | 30.8 | 30.8 |
| Flow(Nm³/h) | 124,528 | 50,413 | 229,306 | 229,303 | 229,298 |

TABLE I-continued

| Gas Compos.(mole %) | | | | | |
|---|---|---|---|---|---|
| $O_2$ | 0.00 | 20.90 | 0.00 | 0.00 | 0.00 |
| $H_2$ | 42.63 | 0.00 | 39.71 | 39.71 | 39.71 |
| $H_2O$ | 35.74 | 0.41 | 27.83 | 27.83 | 27.83 |
| $N_2$ | 0.27 | 77.72 | 17.27 | 17.27 | 17.27 |
| CO | 6.53 | 0.00 | 10.60 | 10.60 | 10.60 |
| $CO_2$ | 5.60 | 0.03 | 4.16 | 4.16 | 4.16 |
| Ar | 0.00 | 0.94 | 0.21 | 0.21 | 0.21 |
| $CH_4$ | 9.23 | 0.00 | 0.21 | 0.21 | 0.21 |
| Gas Heated Reactor | 11 | 19 | | | |
| Catalyst Vol($m^3$) | 19.6 | 7.2 | | | |
| No. of Reforming Tubes | 217 | 127 | | | |
| Wall Temp.(°C.) of Reforming Tubes | | | | | |
| Inlet | 576.9 | 902.2 | | | |
| Outlet | 755.5 | 884.6 | | | |
| Pressure Drop(bar) Shell Side | 0.01 | 0.16 | | | |

(§)Split ratio of stream No. 14:18 = 3.4

TABLE II

| Position/Stream No. | 10 | 12 | 18 | 20 | 14 |
|---|---|---|---|---|---|
| Temp(°C.) | 535.0 | 642.1 | 642.1 | 816.5 | 642.1 |
| Pressure(bar) | 35.0 | 34.6 | 34.6 | 34.3 | 34.6 |
| Flow($Nm^3$/h) | 121,830 | 137,679 | 49,503(§) | 58,528 | 88,176(§) |
| Gas Compos.(mole %) | | | | | |
| $O_2$ | 0.00 | 0.00 | 0.00 | 0.00 | 0.00 |
| $H_2$ | 1.01 | 22.66 | 22.66 | 44.02 | 22.66 |
| $H_2O$ | 70.45 | 52.09 | 52.09 | 34.62 | 52.09 |
| $N_2$ | 0.35 | 0.31 | 0.31 | 0.26 | 0.31 |
| CO | 0.00 | 1.26 | 1.26 | 7.05 | 1.26 |
| $CO_2$ | 0.04 | 4.53 | 4.53 | 5.55 | 4.53 |
| Ar | 0.00 | 0.00 | 0.00 | 0.00 | 0.00 |
| $CH_4$ | 28.14 | 19.15 | 19.15 | 8.48 | 19.15 |
| Position/Stream No. | 16 | 28 | 22 | 24 | 26 |
| Temp(°C.) | 825.0 | 550.0 | 1024.1 | 859.8 | 587.1 |
| Pressure(bar) | 32.7 | 33.0 | 31.0 | 30.9 | 30.8 |
| Flow($Nm^3$/h) | 104,515 | 50,413 | 229,305 | 229,302 | 229,293 |
| Gas Compos.(mole %) | | | | | |
| $O_2$ | 0.00 | 20.9 | 0.00 | 0.00 | 0.00 |
| $H_2$ | 44.22 | 0.00 | 39.71 | 39.71 | 39.71 |
| $H_2O$ | 34.48 | 0.41 | 27.83 | 27.83 | 27.83 |
| $N_2$ | 0.26 | 77.72 | 17.27 | 17.27 | 17.27 |
| CO | 7.23 | 0.00 | 10.60 | 10.60 | 10.60 |
| $CO_2$ | 5.47 | 0.03 | 4.16 | 4.16 | 4.16 |
| Ar | 0.00 | 0.94 | 0.21 | 0.21 | 0.21 |
| $CH_4$ | 8.34 | 0.00 | 0.21 | 0.21 | 0.21 |
| Gas Heated Reactor | 11 | 19 | | | |
| Catalyst Vol($m^3$) | 19.6 | 7.2 | | | |
| No. of Reforming Tubes | 217 | 127 | | | |
| Wall Temp.(°C.) of Reforming Tubes | | | | | |
| Inlet | 555.5 | 879.1 | | | |
| Outlet | 729.6 | 840.8 | | | |
| Pressure Drop(bar) Shell Side | 0.02 | 0.15 | | | |

(§)Split ratio of stream No. 14:18 = 1.8

TABLE III

| Position/Stream No. | 10 | 12 | 18 | 20 | 14 |
|---|---|---|---|---|---|
| Temp(°C.) | 510.0 | 624.2 | 624.2 | 766.1 | 624.2 |
| Pressure(bar) | 35.5 | 34.6 | 34.6 | 33.9 | 34.6 |
| Flow($Nm^3$/h) | 121,830 | 135,861 | 79,201(§) | 90,202 | 56,660(§) |
| Gas Compos.(mole %) | | | | | |
| $O_2$ | 0.00 | 0.00 | 0.00 | 0.00 | 0.00 |
| $H_2$ | 1.01 | 20.54 | 20.54 | 38.50 | 20.54 |
| $H_2O$ | 70.45 | 53.87 | 53.87 | 39.03 | 53.87 |
| $N_2$ | 0.35 | 0.32 | 0.32 | 0.28 | 0.32 |
| CO | 0.00 | 1.02 | 1.02 | 4.82 | 1.02 |
| $CO_2$ | 0.04 | 4.18 | 4.18 | 5.84 | 4.18 |
| Ar | 0.00 | 0.00 | 0.00 | 0.00 | 0.00 |
| $CH_4$ | 28.14 | 20.07 | 20.07 | 11.53 | 20.07 |
| Position/Stream No. | 16 | 28 | 22 | 24 | 26 |
| Temp(°C.) | 900.0 | 550.0 | 1027.5 | 825.5 | 571.2 |
| Pressure(bar) | 32.7 | 33.0 | 31.0 | 30.9 | 30.8 |

TABLE III-continued

| | | | | | |
|---|---|---|---|---|---|
| Flow(Nm³/h) | 73,022 | 50,413 | 229,355 | 229,357 | 229,362 |
| Gas Compos.(mole %) | | | | | |
| $O_2$ | 0.00 | 20.9 | 0.00 | 0.00 | 0.00 |
| $H_2$ | 50.97 | 0.00 | 39.71 | 39.71 | 39.71 |
| $H_2O$ | 29.18 | 0.41 | 27.84 | 27.84 | 27.84 |
| $N_2$ | 0.24 | 77.72 | 17.27 | 17.27 | 17.27 |
| CO | 10.58 | 0.00 | 10.63 | 10.63 | 10.63 |
| $CO_2$ | 4.66 | 0.03 | 4.14 | 4.14 | 4.14 |
| Ar | 0.00 | 0.94 | 0.21 | 0.21 | 0.21 |
| $CH_4$ | 4.37 | 0.00 | 0.20 | 0.20 | 0.20 |
| Gas Heated Reactor | 11 | 19 | | | |
| Catalyst Vol(m³) | 19.6 | 7.2 | | | |
| No. of Reforming Tubes | 217 | 127 | | | |
| Wall Temp.(°C.) of Reforming Tubes | | | | | |
| Inlet | 534.2 | 830.3 | | | |
| Outlet | 705.5 | 793.2 | | | |
| Pressure Drop(bar) Shell Side | 0.02 | 0.15 | | | |

(§)Split ratio of stream No. 14:18 = 0.7

As apparent from the results in Table 1-3, the temperature of the tube walls in the gas heated reactors 11 and 19, which are in contact with carbon monoxide containing gas can be adjusted to different temperature ranges without effecting the composition of the product gas 22 leaving the adiabatic reformer 17, by varying the split ratio in which the partially primary reformed gas from the first gas heat reactor 11 is passed in parallel to the conventional heated primary reformer 15 and the second gas heated reactor 19. Thereby, it is possible to control the temperature to ranges outside the critical temperatures for metal dusting.

Having thus described the invention in detail, it is to be understood that the foregoing description and example are given only to illustrate and exemplify the present invention, changes and alterations, which will be readily apparent to those skilled in the art, are contemplated as within the scope of the present invention, which is limited only by the claims which follow.

I claim:

1. A reactor system for a hydrocarbon conversion process, comprising:

(i) a first gas heated reactor including a shell side and reforming tubes for partially reforming a hydrocarbon feed using steam to form a partially reformed process gas, the first gas heated reactor being adapted to receive heat by indirect counter flow heat exchange with a product gas stream introduced into the shell side of the first gas heated reactor;

(ii) means for dividing the partially reformed process gas from the first gas heated reactor into a first and second substream;

(iii) a tubular reactor furnace including reforming tubes and means for producing radiant heat by burning fuel, the furnace being adapted to receive and react the first substream to produce a first reformed gas stream;

(iv) a second gas heated reactor including a shell side and reforming tubes for receiving and reforming the second substream, the second gas heated reactor being adapted to receive heat by indirect parallel-flow heat exchange using a product gas stream introduced into the shell side of the second gas heated reactor to produce a second reformed gas stream;

(v) means for combining the first reformed gas stream from the tubular reactor furnace and the second reformed gas stream from the second gas heated reactor and means for passing the combined reformed gas stream to an adiabatic secondary reforming reactor;

(vi) means for passing an oxidant gas to the adiabatic reactor;

(vii) the adiabatic reactor being adapted to receive and react the combined reformed gas stream with an oxidant gas to produce the product gas stream;

(viii) means for passing and introducing the product gas stream from the adiabatic reactor into the shell side of the second gas heated reactor; and (ix) means for passing and introducing the product gas stream from the second gas heated reactor into the shell side of the first gas heated reactor.

2. The reactor system of claim 1, wherein the reforming tubes in the first and second gas heated reactors each have inlets which are bottleneck-shaped.

3. The reactor system of claim 2, further comprising means for telescopically suspending each reformer tube in the first and second gas heated reactors.

4. The reactor system of claim 32, wherein the telescopic suspending means comprises a plurality of bellows, each bellow concentrically surrounding an inlet of each reformer tube, and a tubesheet attached to the bellows.

5. The reactor system of claim 1, wherein the means for dividing the partially reformed process gas comprises a valve.

* * * * *